April 30, 1974  A. BALLAGNY  3,808,099

FUEL ELEMENT FOR A NUCLEAR REACTOR

Filed June 20, 1972

United States Patent Office 3,808,099
Patented Apr. 30, 1974

3,808,099
FUEL ELEMENT FOR A NUCLEAR REACTOR
Alain Ballagny, Villebon-sur-Yvette, France, assignor to Commissariat a l'Energie Atomique, Paris, France
Filed June 20, 1972, Ser. No. 264,600
Claims priority, application France, June 25, 1971, 7123305
Int. Cl. G21c 3/06
U.S. Cl. 176—73       4 Claims

ABSTRACT OF THE DISCLOSURE

The fuel element comprises a graphite casing of generally cylindrical shape and constituted by two coaxial tubular sleeves closed by an end-cap at each extremity and forming therebetween an annular space in which cylindrical compacts of fissile material are arranged in a stack, the inner sleeve of the casing being provided with one or a number of longitudinal slits formed radially or at an oblique angle through the entire thickness of the sleeve.

---

Figure 1:
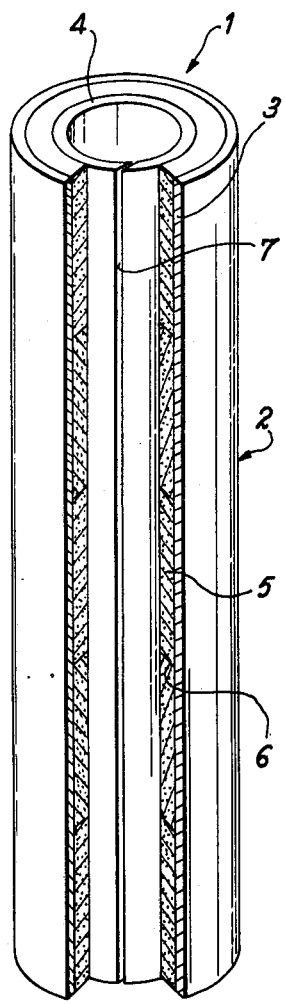

This invention relates to an improvement in fuel elements of the same type in particular as those designed for use in so-called high-temperature reactors in which the coolant is a gas and especially helium in forced circulation.

It is known that fuel elements of this type are usually constituted by cylindrical graphite casings which contain ceramic fissile material. More precisely, this material is usually provided in the form of compacts containing kernels of carbide or oxide of a fissile element, said kernels being coated with pyrocarbon and in some cases with silicon carbide so as to constitute "particles" which are in turn dispersed in a carbonaceous matrix.

It is also known that, in order to improve the thermal energy yield of fuel elements of this type, it is desirable to provide compacts of annular shape so as to permit cooling of these latter by causing the circulating helium to come into contact with both the internal and external faces of said annular compacts. In this case, the graphite casings consist of two coaxial tubular sleeves which are joined together at their extremities by means of end-caps and between which is formed an intermediate space, the annular compacts being placed within said space and stacked directly on top of each other. If necessary, a sufficient longitudinal clearance is provided between the end-cap and the end compacts in order to prevent the development of stresses at the time of assembly and during operation.

In designs of this type, the annular compacts undergo radial shrinkage on the one hand as a result of irradiation and on the other hand under the action of high temperature, thus binding the pellets against the inner tubular sleeve of the casing. This has the effect of setting up appreciable stresses, with the attendant danger of subsequent fracture of the annular compacts and of fission-product release as a result of total loss of cohesion of the particles which constitute these compacts.

The present invention relates to an improvement which is made in the fuel elements of the aforementioned type and endows these latter with considerably better performance characteristics under the action of radiation, a particularly noteworthy result being to prevent any failure of fuel compacts.

To this end, the fuel element considered, which comprises a graphite casing of generally cylindrical shape and constituted by two coaxial tubular sleeves closed by an end-cap at each extremity and forming therebetween an annular space in which are stacked cylindrical compacts of fissile material, is characterized in that the inner sleeve of the casing is provided with at least one longitudinal slit formed through the entire thickness of said sleeve.

In a first alternative embodiment, the inner sleeve has a single slit which extends over the total length of the casing. Depending on requirements, said slit can be either radial or oblique.

In another alternative embodiment, the inner sleeve is provided with a plurality of parallel slits spaced at intervals about the axis of the sleeve, said slits being intended to open alternately at each extremity of the sleeve.

Whatever form of construction may be adopted, the aim of the invention is to permit deformation of the inner sleeve when this latter is put in a state of compression by annular compacts under operating conditions, while avoiding failure of the fuel material which constitutes said compacts and which usually exhibits very low tensile strength. Accordingly, the overall width of the slit or slits of the inner sleeve must be such as to provide compensation for the relative maximum deformation both of the sleeve and of the compacts. However, said slit width must be of minimum value in order to prevent the particles constituting the annular compacts from passing through the slits and escaping into the helium coolant gas. With this objective, the second alternative embodiment which makes use of a plurality of parallel slits makes it possible to subdivide the total width of said slits as required, with the result that any leakage is highly improbable.

Figure 2:
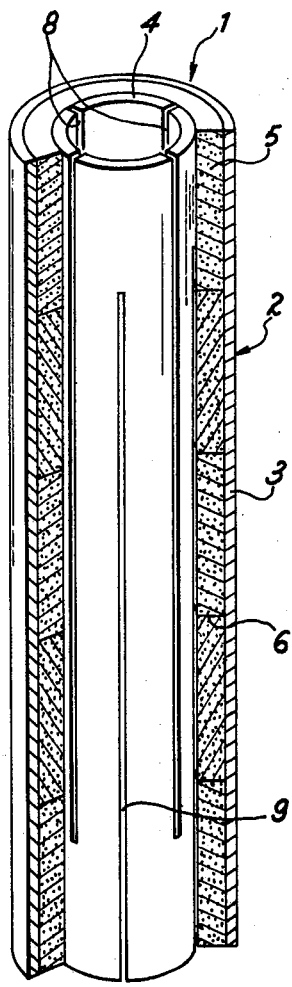

Further characteristic features of a fuel element as constructed in accordance with the invention will become apparent from the following description of two exemplified embodiments which are given by way of indication without any limitation being implied, reference being made to the accompanying drawing in which FIGS. 1 2 are part-sectional views in perspective of two of the aforesaid alternative embodiments.

The fuel element 1 which is illustrated in FIG. 1 comprises a graphite casing 2 formed by two cylindrical and coaxial tubular sleeves designated respectively by the reference numerals 3 and 4, said sleeves being normally closed at their extremities by end-caps (not shown). The intermediate annular space defined by the two sleeves is occupied by stacked fuel compacts 5 which are preferably made up of particles of ceramic fissile material embedded in a carbonaceous supporting matrix. Said compacts 5 are placed in vertically stacked relation within said space with their end faces 6 in contact with each other.

In accordance with the invention, the inner tubular sleeve 4 of the casing 2 is provided with a longitudinal slit 7 which, in the alternative embodiment shown in FIG. 1, extends from one end of said sleeve to the other. Depending on requirements, said slit 7 can be formed radially at right angles to the surface of the tubular sleeve 4 or alternatively at an oblique angle with respect to the radial direction as shown in the figure.

In the second alternative embodiment which is illustrated in FIG. 2, the inner tubular sleeve 4 of the casing 2 is provided with a plurality of longitudinal and parallel slits which are preferably uniformly spaced about the axis of said sleeve. Said slits which are respectively designated by the references 8 and 9 open alternatively at each end of the sleeve 4.

Irrespective of the alternative embodiment which is adopted, the total width of the slits formed in the inner sleeve of the casing 2 is so determined as to endow said sleeve with a sufficient degree of elasticity to withstand the total radial shrinkage stress produced during operation by the fuel compacts 5 which shrink against said sleeve. It should be noted that, in the design solution which is illustrated in FIG. 2 and in which provision is made for a series of slits 8 and 9 having their openings alternately at each end of the sleeve, the fuel compacts 5 and said sleeve remain continuously in contact with each other throughout the period of mutual interaction of these latter whereas, in the design solution shown in FIG. 1, slight ovalization of the compacts 5 may take place at the moment of said interaction.

By virtue of the elasticity which is thus conferred on the inner sleeve of the casing, the arrangement which is contemplated makes it possible in all cases to accept wider tolerances in the dimensions of the annular compacts. The initial clearance between the inner sleeve and the compacts may if necessary be reduced or even made non-existent, thereby improving the overall thermal performances of the fuel element.

It is readily apparent that the invention is not limited in any sense to the examples of construction which have been more especially described in the foregoing with reference to the drawings but extends to any or all alternative forms.

What I claim is:

1. A fuel element for a nuclear reactor, comprising a graphite casing of generally cylindrical shape and constituted by two coaxial tubular sleeves closed by an endcap at each extremity and forming therebetween an annular space in which are stacked cylindrical compacts of fissile material, wherein the inner sleeve of the casing is provided with at least one longitudinal slit formed through the entire thickness of said sleeve.

2. A fuel element according to claim 1, wherein the inner sleeve has a single slit which extends over the total length of the casing.

3. A fuel element according to claim 2, wherein the single slit is either radial or oblique.

4. A fuel element according to claim 1, wherein the inner sleeve is provided with a plurality of parallel slits spaced at intervals about the axis of the sleeve, said slits being intended to open alternately at each extremity of said sleeve.

References Cited
UNITED STATES PATENTS

| | | | |
|---|---|---|---|
| 3,291,696 | 12/1966 | Sugimoto et al. | 176—91 R |
| 3,189,101 | 6/1965 | Blake | 176—73 |
| 3,184,392 | 5/1965 | Blake | 176—73 |
| 3,325,375 | 6/1967 | Mogard | 176—91 R |

REUBEN EPSTEIN, Primary Examiner

U.S. Cl. X.R.

176—91 R